US011420629B2

(12) United States Patent
Olivas et al.

(10) Patent No.: US 11,420,629 B2
(45) Date of Patent: Aug. 23, 2022

(54) ENGINE BRAKE RAMPING

(71) Applicant: Cummins Inc., Columbus, IN (US)

(72) Inventors: Daniel Payan Olivas, Columbus, IN (US); Sneha Padaki, Columbus, IN (US)

(73) Assignee: Cummins Inc., Columbus, IN (US)

( * ) Notice: Subject to any disclaimer, the term of this patent is extended or adjusted under 35 U.S.C. 154(b) by 243 days.

(21) Appl. No.: 16/887,734

(22) Filed: May 29, 2020

(65) Prior Publication Data

US 2021/0370944 A1 Dec. 2, 2021

(51) Int. Cl.
*B60W 30/18* (2012.01)
*B60W 10/18* (2012.01)
*B60W 10/198* (2012.01)
*B60W 10/196* (2012.01)
*B60W 10/192* (2012.01)

(52) U.S. Cl.
CPC ...... *B60W 30/18136* (2013.01); *B60W 10/18* (2013.01); *B60W 10/192* (2013.01); *B60W 10/196* (2013.01); *B60W 10/198* (2013.01); *B60W 2510/069* (2013.01); *B60W 2510/0657* (2013.01); *B60W 2510/0661* (2013.01); *B60W 2510/10* (2013.01); *B60W 2520/10* (2013.01); *B60W 2540/10* (2013.01); *B60W 2710/0666* (2013.01); *B60W 2710/0672* (2013.01); *B60W 2710/18* (2013.01); *B60Y 2300/18133* (2013.01)

(58) Field of Classification Search
CPC ........... B60W 30/18136; B60W 10/18; B60W 10/192; B60W 10/196; B60W 10/198; B60W 2510/0657; B60W 2510/0661; B60W 2510/069; B60W 2510/10; B60W 2520/10; B60W 2540/10; B60W 2710/0666; B60W 2710/0672; B60W 2710/18; B60W 30/14; B60Y 2300/18133
USPC .......................................................... 701/70
See application file for complete search history.

(56) References Cited

U.S. PATENT DOCUMENTS

| 4,171,029 A | * | 10/1979 | Beale | F02D 29/02 |
| | | | | 180/54.1 |
| 4,257,363 A | | 3/1981 | Zeller | |
| 4,618,041 A | * | 10/1986 | Sotoyama | F16H 61/143 |
| | | | | 477/61 |
| 4,833,386 A | * | 5/1989 | Unsworth | H02P 3/18 |
| | | | | 318/729 |
| 5,088,384 A | * | 2/1992 | Lonnemo | F15B 13/02 |
| | | | | 91/461 |

(Continued)

FOREIGN PATENT DOCUMENTS

WO WO-2014/171906 A1 10/2014

*Primary Examiner* — B M M Hannan
(74) *Attorney, Agent, or Firm* — Foley & Lardner LLP (57) ABSTRACT

Systems and methods for controlling engine brake disengagement in a vehicle include a controller receiving a signal indicative of a command to disengage an engine brake while the vehicle engine is in engine brake engaged condition. The engine can be subjected to a first negative torque under the engine brake engaged condition. The controller can cause the engine brake to be gradually disengaged over a time period using a predefined torque ramp rate, responsive to the signal. The gradual disengagement of the engine brake can be in the form of a phased out disengagement, and can reduce vehicle engine jerk associated with engine brake disengagement.

20 Claims, 6 Drawing Sheets

(56) References Cited

U.S. PATENT DOCUMENTS

| | | | |
|---|---|---|---|
| 5,957,668 A * | 9/1999 | Moody | F04D 15/0066 417/409 |
| 6,104,977 A | 8/2000 | Avery, Jr. | |
| 6,286,617 B1 * | 9/2001 | DeLuca | B60T 13/662 180/282 |
| 6,374,174 B2 | 4/2002 | Hellmann et al. | |
| 6,536,408 B1 * | 3/2003 | Warner | B60W 30/18136 303/142 |
| 6,629,026 B1 * | 9/2003 | Baraszu | B60K 6/48 701/67 |
| 7,281,770 B1 * | 10/2007 | Curran | B60T 1/10 303/151 |
| 7,416,265 B2 | 8/2008 | Holt et al. | |
| 7,860,631 B2 | 12/2010 | Williams | |
| 8,312,861 B2 | 11/2012 | Ott et al. | |
| 9,938,907 B2 | 4/2018 | Hellemann | |
| 2002/0020574 A1 * | 2/2002 | DeLuca | B60T 7/042 180/275 |
| 2004/0216980 A1 * | 11/2004 | Kim | F16H 61/22 192/220.2 |
| 2008/0269011 A1 * | 10/2008 | Sopko | B60W 10/105 477/34 |
| 2011/0221265 A1 * | 9/2011 | Busack | B60T 8/17616 303/152 |
| 2011/0315499 A1 * | 12/2011 | Fukushiro | F16H 61/08 192/3.57 |
| 2012/0266701 A1 * | 10/2012 | Yamada | B60K 6/48 180/65.265 |
| 2013/0304344 A1 * | 11/2013 | Abe | B60L 7/26 701/70 |
| 2014/0162845 A1 * | 6/2014 | Rindfleish | B60W 10/06 477/94 |
| 2015/0040859 A1 * | 2/2015 | Scavone | F02D 41/12 123/323 |
| 2016/0290443 A1 * | 10/2016 | Kutsubo | F16H 3/66 |
| 2016/0347315 A1 * | 12/2016 | Ngo | B60W 10/184 |
| 2017/0015308 A1 * | 1/2017 | Ortmann | B60W 10/02 |
| 2018/0037226 A1 * | 2/2018 | Otake | B60W 10/04 |
| 2018/0099675 A1 * | 4/2018 | Boisvert | B60W 10/02 |
| 2020/0146908 A1 * | 5/2020 | Harrison | B62K 23/06 |
| 2020/0207327 A1 * | 7/2020 | Imamura | B60K 6/445 |
| 2020/0309258 A1 * | 10/2020 | McKinzie | F16H 61/04 |
| 2021/0188264 A1 * | 6/2021 | Okuda | G08G 1/096791 |
| 2021/0332555 A1 * | 10/2021 | Metzger | E02F 9/2296 |

* cited by examiner

ENGINE BRAKE RAMPING

TECHNICAL FIELD

The present disclosure relates to engine braking. More particularly, the present disclosure relates to systems and methods for engine brake ramping.

BACKGROUND

Engine braking is a braking mechanism to slow down motor vehicles by controlling fluid flow into (or from) the engine to create a negative torque. As opposed to external braking mechanisms, such as friction brakes, which exert a force on the wheels to slow down the motor vehicle, the general idea behind engine braking is to control pressure within the engine cylinders in a way to apply a negative torque to the engine and therefore decrease engine output. Using engine brakes, e.g., to slow down the vehicle, helps mitigating the wear to brake pads in traditional brakes, and therefore, extending the life of the friction-based brakes.

SUMMARY

One embodiment relates to a controller for controlling engine brake disengagement that includes a processor and a memory storing executable instructions. The executable instructions when executed by the processor can cause the processor to receive a signal indicative of a command to disengage an engine brake for an engine in engine brake engaged condition. The engine can be subjected to a first negative torque under the engine brake engaged condition. The processor can determine an incremental engine brake disengagement pattern using the predefined torque ramp rate. The processor can cause the engine brake to be gradually disengaged over a time period according to the incremental engine brake disengagement pattern.

Another embodiment relates to a method of controlling engine brake disengagement that includes a controller receiving a signal indicative of a command to disengage an engine brake for an engine in engine brake engaged condition. The engine can be subjected to a first negative torque under the engine brake engaged condition. The method includes the controller determining an incremental engine brake disengagement pattern using the predefined torque ramp rate, and causing the engine brake to be gradually disengaged over a time period according to the incremental engine brake disengagement pattern.

Another embodiment relates to a system that includes an engine and a controller. The controller can receive a signal indicative of a command to disengage an engine brake while the engine is in engine brake engaged condition. The engine can be subjected to a first negative torque under the engine brake engaged condition. The controller can determine an incremental engine brake disengagement pattern using the predefined torque ramp rate, and cause the engine brake to be gradually disengaged over a time period according to the incremental engine brake disengagement pattern.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for engine brake ramping. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for controlling engine brake disengagement in vehicles. Specifically, the various embodiments disclosed herein relate to systems, apparatuses, and methods for engine brake ramping.

Engine brakes are typically used in heavy-duty vehicles to slow down the vehicle. The driver of a vehicle can trigger the engine brake, for example, by releasing the accelerator and shifting down through gears. In response, the engine brake causes the retarder to disengage immediately. The full disengagement of the retarder may lead to instant and significant increase in the torque applied to the engine, which causes a sudden jerk of the vehicle that is felt by the driver, and any passengers, inside the vehicle cab. Specifically, the instant disengagement of the engine brake may result in a sharp transition from the negative torque applied by the engine brake to a positive torque, which in turn causes a very sudden change in the vehicle acceleration. Such sudden change shakes the vehicle cab and the driver therein.

To improve drivability and driver's comfort, systems and methods described herein allow for smoothing the engine brake disengagement. Specifically, an engine brake ramping system can be configured to gradually, instead of instantly and fully, disengage the engine brake resulting in a relatively smaller and smoother variation in the vehicle acceleration. From a physics point of view, the engine brake ramping system can enforce a gradual or smoother transition from the negative torque applied to the engine, when the engine brake is on, to a zero or positive torque. Gradual or incremental increase of the torque during a transition period when the engine (or vehicle) transitions from an engine brake engaged condition (or mode) to an engine brake disengaged condition (or mode), responsive to a command or indication to disengage the engine brake, reduces the variation in vehicle acceleration during that period. The reduction in acceleration variation translates into less (or reduced) cab or vehicle jerk or shaking.

The gradual or incremental disengagement of the engine brake presents a tradeoff. On one hand, the longer the transition period during which the engine brake is gradually or incrementally disengaged, the more significantly the cab or vehicle jerk can be reduced. On the other hand, extending the time period during which the engine brake is gradually or incrementally disengaged can be felt by the vehicle driver as delay in the disengagement of the engine brake. Specifically, if the engine brake disengagement time period is relatively long, the driver will feel that the vehicle is slow to pick up speed once a command for disengaging the engine brake is made. The tradeoff calls for finding a balance between the desire to mitigate vehicle or cab jerk and the desire to disengage the engine brake fast enough so that the driver perceives no delay or the vehicle does not feel to be slow to gain speed after a command for disengaging the engine brake is triggered. The systems and methods described herein address this tradeoff by using a predefined torque ramping rate to determine how and for how long the engine brake disengagement process is performed.

Figure 1:
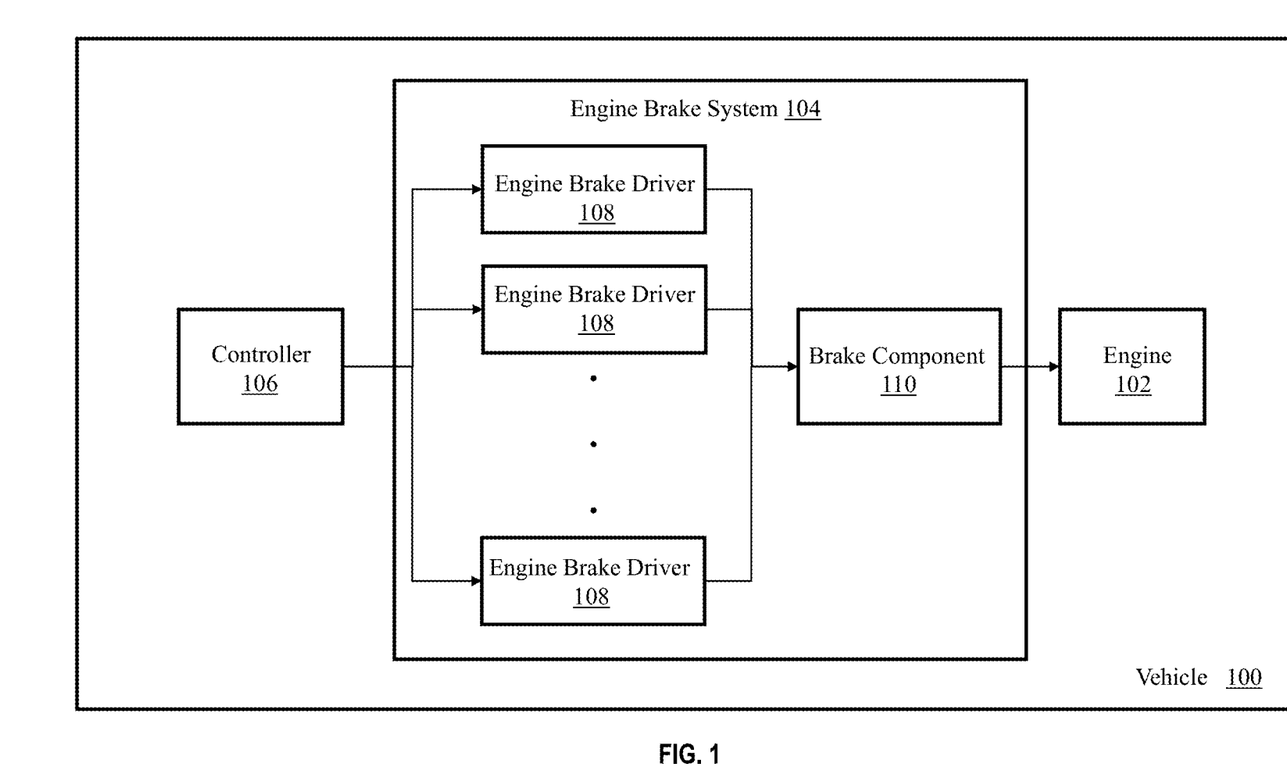
FIG. 1 is a block diagram of a vehicle employing engine brake ramping, according to an example embodiment.

Referring now to FIG. 1, an example block diagram of a vehicle 100 employing engine brake ramping is shown, according to an example embodiment. The vehicle 100 may be any vehicle that employs/utilizes engine braking. The vehicle 100 may include an on-road or an off-road vehicle including, but not limited to, line-haul trucks, mid-range trucks (e.g., pick-up truck, etc.), sedans, coupes, tanks, airplanes, boats, and any other type of vehicle that utilizes engine braking. Regarding trucks, the vehicle 100 can be a medium-duty truck (e.g., having a weight between 14000 and 26000 lbs.), a heavy-duty truck (e.g., having a weight between 26000 and 33000 lbs.), a very-heavy-duty truck (e.g., weighing more than 33000 lbs.), or another type of vehicle. Based on these configurations, various additional types of components may also be included in the vehicle, such as a transmission, one or more gearboxes, pumps, actuators, or anything that is powered by an engine.

The vehicle 100 is shown to include an engine 102, an engine brake system 104 and a controller 106 coupled to these components. The engine 102 may be an internal combustion engine (e.g., gasoline, natural gas, or diesel engines), a hybrid engine system (e.g., a combination of an internal combustion engine and an electric motor), and/or any other suitable engine. In the example shown, the engine 102 is structured as a compression-ignition engine powered by diesel fuel. Within the internal combustion engine 102, air from the atmosphere is combined with fuel, and combusted, to power the engine. Combustion of the fuel and air in the compression chambers of the engine 102 produces exhaust gas that is operatively vented to an exhaust manifold and to, in some embodiments, an exhaust aftertreatment system which treats the expelled gas to reduce the emission of harmful elements, such as NOx, particulate matter, CO, and so on.

The engine brake system 104 is shown to include a plurality of engine brake drivers 108 and a brake component 110. The brake component 110 can be configured to apply a negative torque to the engine 102 to slow the vehicle 100 or maintain a steady speed when driving downhill without using friction. The brake component 110 can include an exhaust engine brake, a compression release engine brake, a hydraulic retarder, an electric retarder or a combination thereof. An exhaust engine brake, when actuated, closes the exhaust valves thereby preventing the gases from exiting through the exhaust pipe. The closing of the exhaust valves creates a backpressure in the manifold and in the cylinders. The backpressure resists the motion of the engine pistons and causes the vehicle to slow down. A compression release engine brake, when activated, slows the vehicle by causing the exhaust valves to open up right before the compression stroke ends rather than at the end of the power stroke. As such, the compressed gas trapped in the cylinders is released before it could be used to drive the engine pistons during the power stroke. A hydraulic retarder operates by pumping fluid into a chamber enclosing rotating vanes (e.g., vanes attached to a transmission driveshaft), when retardation is desired. The pumped fluid induces viscous drag forces that slows the motion of the vanes, and therefore, slows the vehicle. An electronic retarder, when actuated, operates by employing electromagnetic induction to induce retardation forces. The electric retarder can include one or more retardation units, each of which having a respective rotor attached to the axle, transmission or driveline, and a respective stator attached to the vehicle chassis. When in a retardation (or engine brake engaged) mode, the stator can receive power from the vehicle battery and generate a magnetic field. As the rotor moves through the magnetic field, an eddy current is induced in the rotor causing a second magnetic field opposing the magnetic field generated by the stator. The second magnetic field slows the rotor and as such slows the vehicle.

As mentioned above and in some implementations, the engine brake system 104 can include one or more engine brake drivers 108. The engine brake driver 108 can be configured to partially control disengagement (or disabling) of engine braking or of the brake component 110. For instance, an engine brake driver 108 can be coupled to an exhaust valve (one driver per exhaust valve) to control the opening and/or closing of the respective exhaust valves for an exhaust engine brake or a compression release engine brake. In a hydraulic retarder, the engine brake driver 108 can control the opening and/or closing of a respective valve to pump in, or release fluid from, the chamber enclosing the vanes. In an electric retarder, the engine brake driver 108 can control the activation or deactivation of a respective electric retardation unit. Each engine brake driver 108 can be (or can include) an electric or electronic circuit. The engine brake drivers 108 can also control actuation of engine braking. Thus, depending on the configuration of the brake component 110, the configuration of the engine brake driver(s) 108 may also change.

The controller 106 can control disengagement of engine braking responsive to an indication or command to disengage an engine braking condition (or mode). As discussed in further detail below, the controller 106 (or engine brake ramping system controller or control system) can detect an engine braking disengagement event, and in response send instructions to the engine brake system 104 or the engine brake drivers 108 to gradually or incrementally (instead of instantly and fully) disengage an engine braking condition (or mode) that is on. Example engine braking disengagement events can include the driver pressing the acceleration pedal, deactivating (or switching off) an engine brake switch, or changing to a higher gear. When the vehicle is in cruise control mode, engine braking can be activated, for example, when the vehicle is going downhill to maintain a steady speed. The engine brake ramping system 106 can disengage engine brake if the vehicle speed starts to decrease below the cruise control speed.

As the components of FIG. 1 are shown to be embodied in the vehicle 106, the controller 106 may be structured as one or more electronic control units (ECU). The controller 106 may be separate from or included with at least one of the engine brake system 104 or the brake component 110, a transmission control unit, an exhaust aftertreatment control unit, a powertrain control module, an engine control module, etc. The function and structure of the controller 100 is described in greater detail in FIGS. 2 and 3.

Figure 2:
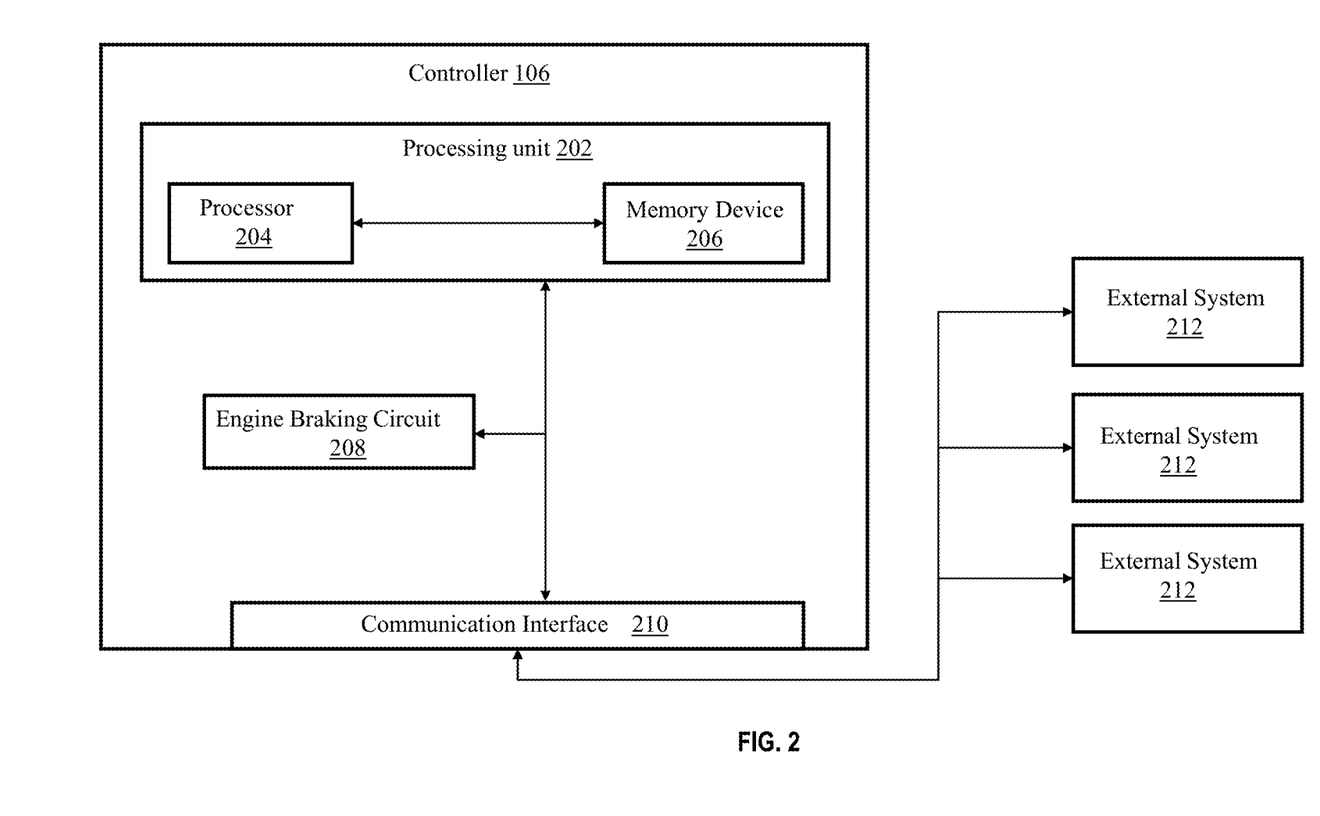
FIG. 2 is an block diagram of an engine brake ramping system, according to an example embodiment.

Referring now to FIG. 2, a schematic diagram of the controller 106 of the vehicle 100 of FIG. 1 is shown according to an example embodiment. As shown in FIG. 2, the controller 106 includes a processing circuit 202 having a processor 204 and a memory device 206, an engine braking circuit 208, and a communications interface 210. The controller 106 is structured to detect an engine braking disengagement event, and in response cause an engine braking condition (or mode) that is currently on to be gradually or incrementally (instead of instantly and fully) disengaged.

In one configuration, the engine braking circuit 208 can be embodied as a machine or a computer-readable medium having instructions stored thereon that are executable by a processor, such as processor 204. As described herein and amongst other uses, the machine-readable medium can facilitate performance of certain operations to enable reception and transmission of data. For example, the machine-readable medium may provide an instruction (e.g., command, etc.) to, e.g., acquire data or may preprocess received data. In this regard, the machine-readable medium may include programmable logic that defines the frequency of acquisition of the data (or, transmission of the data), or defines checks to be performed on the received data. The computer readable medium may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine braking circuit 208 can be embodied as a hardware unit, such as electronic control unit. As such, the engine braking circuit 208 may be embodied as one or more circuitry components including, but not limited to, processing circuitry, network interfaces, peripheral devices, input devices, output devices, sensors, etc. In some embodiments, the engine braking circuit 208 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine braking circuit 208 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The engine braking circuit 208 may also include programmable hardware devices such as field programmable gate arrays, programmable array logic, programmable logic devices or the like. The engine braking circuit 208 may include one or more memory devices for storing instructions that are executable by the processor(s) of the engine braking circuit 208. The one or more memory devices and processor(s) may have the same definition as provided below with respect to the memory device 206 and processor 204. In some hardware unit configurations, the engine braking circuit 208 may be geographically dispersed throughout separate locations in the vehicle 100. Alternatively and as shown, the engine braking circuit 208 may be embodied in or within a single unit/housing, which is shown as the controller 106.

In the example shown, the controller 106 includes the processing circuit 202 having the processor 204 and the memory device 206. The processing circuit 202 may be structured or configured to execute or implement the instructions, commands, and/or control processes described herein with respect to engine braking circuit 208, or to execute instructions stored in the memory device 206. The depicted configuration represents the engine braking circuit 208 as a machine or a computer-readable medium. However, as mentioned above, this illustration is not meant to be limiting as the present disclosure contemplates other embodiments where the engine braking circuit 208, or at least a component thereof, is configured as a hardware unit. All such combinations and variations are intended to fall within the scope of the present disclosure.

The processor 204 may be implemented or performed with a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., engine braking circuit 208 or components thereof may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communication interface 210 can be a circuit that enables the controller 106 to communicate with other devices or systems in the vehicle 100. For instance, the communication interface 210 can receive signals indicative of commands to disengage the engine braking condition (or mode) of the engine brake system 104. The communication interface can be coupled to various external systems 212. The external systems 212 can include an engine brake switch of the vehicle 100 used to switch the engine brake 106 ON or OFF. In some implementations, the engine brake switch can repeatedly send signals to the controller 106 indicative of the state of the engine brake switch, e.g., ON or OFF. The engine brake switch may send the signals to the controller 106 each time the driver of the vehicle 100 uses the engine brake switch to change the condition or mode of the engine brake. Each signal sent by the engine brake switch can include an indication of a current state of the switch (or a current condition or mode of the engine brake system 104), a change in the state of the switch, or a combination thereof.

The communication interface 210 can include a plurality of communication ports. For example, each communication port can be connected to a respective external system 212 of a plurality of external systems 212. For example, the communication interface 210 can include a communication port connected to the engine brake system 106, a communication port connected to the transmission gearbox, a communication port connected to the transmission gearbox, a communication port connected to the electronic control throttle circuit, and a communication port connected to the cruise control system. In some implementations, the communication interface 210 can include a single port connected to all the external systems.

In this regard, components of the vehicle 100 may communicate with each other or foreign components (e.g., a remote operator) using any type and any number of wired or wireless connections. Communication between and among the controller 106 via the communication interface 210 and the components of the vehicle 100 may be via any number of wired or wireless connections (e.g., any standard under IEEE 802). For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The external systems 212 can include a cruise control system of the vehicle 100 or a circuit thereof. The cruise control system controls the vehicle speed when the vehicle 100 is in cruise control mode. The cruise control system can activate or enable the engine brake system to maintain a steady vehicle speed, e.g., when the vehicle 100 is going downhill. The cruise control system can disable the engine brake system 104, for example, when the vehicle speed decreases or is about to decrease below the cruise control speed. The cruise control system can send signals to the controller 106, via the communication interface 210, indicative of a current condition or mode (e.g., activated or deactivated) of the engine brake system 104, a command or an indication of an event to change the condition or mode of the engine brake system 104, an indication of cruise control mode, or a combination thereof.

The external systems 212 can include an electronic control throttle circuit of the vehicle 100 configured to electronically connect the accelerator pedal to the throttle or other electric circuit that monitors the accelerator pedal. Upon a change in the condition or state of the accelerator pedal (e.g., pressed or released), the electronic control throttle circuit (or other electric circuit monitoring the accelerator pedal) can send a signal to the controller 106 indicative of a current state of the accelerator pedal, changes in the state of the accelerator pedal or a combination thereof. The external systems 212 can include the transmission gearbox of vehicle 100 or a circuit thereof. The transmission gearbox can send signals to the controller 106 indicative of a current gear position, a change in gear position or a combination thereof.

The external systems 212 coupled to the controller 106 can include the engine brake system 104 or the respective engine drivers 108, as illustrated in FIG. 1. In some implementations, the engine brake system 104 can repeatedly, or responsive to specific events, send an indication of a current condition or mode of the engine brake system 104 (e.g., engaged or disengaged) to the controller 106 via the communication interface 210. The controller 106 can send, via the communication interface 210, a signal indicative of a command or instruction to incrementally or gradually disengage the brake component 110.

In some implementations, the engine braking circuit 208 can preprocess signals received by the communication interface 210. The engine braking circuit 208 can transform received analog signals into digital data. The engine braking circuit 208 can check whether the engine brake system 104 is currently engaged or disengaged, based on the received signals. In some implementations, the engine braking circuit 208 can pass the received signals or the corresponding digital data to the processing unit 202 upon determining that the engine brake system is currently engaged. Given that engine brake disengagement implies that the engine brake system 104 is currently in engaged condition (or mode), the engine braking circuit 208 may pass the received signals (or corresponding data) to the processing unit 202 for further processing and applying engine brake ramping, upon determining that the engine brake system 104 is currently in an engaged condition.

Figure 3:
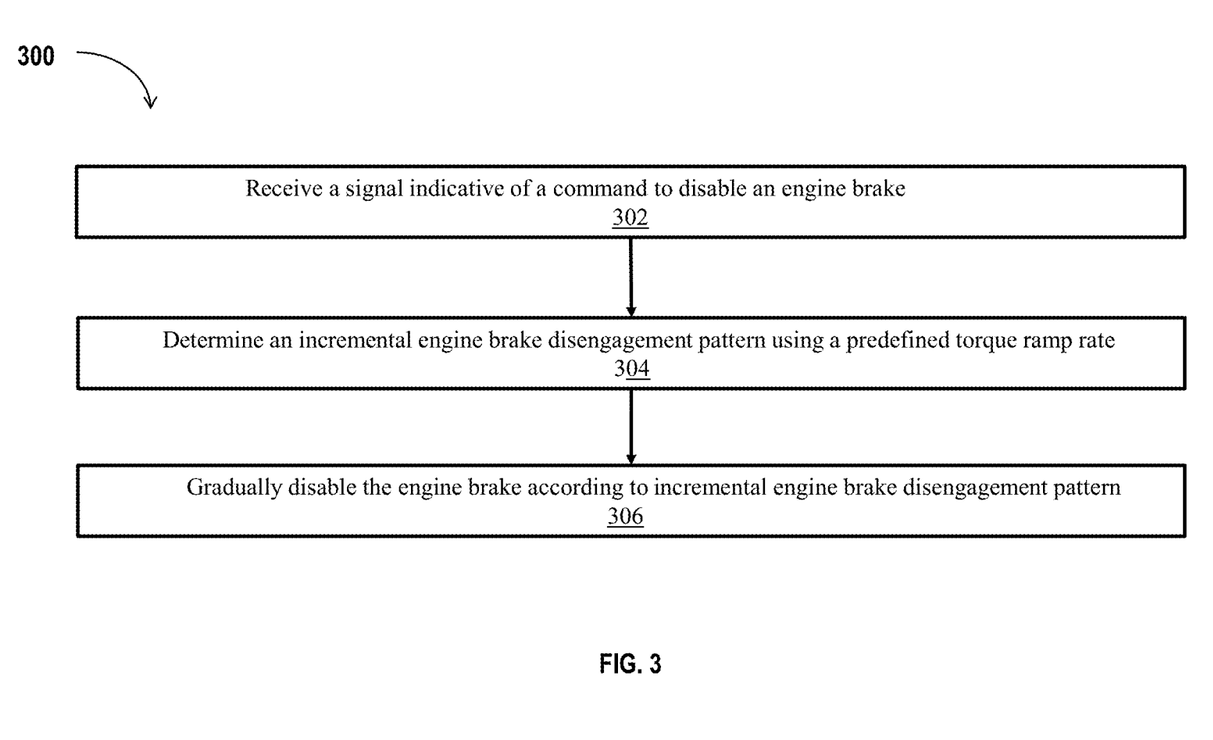
FIG. 3 is a flowchart illustrating a method of engine brake ramping, according to an example embodiment.

FIG. 3 is a flowchart illustrating a method 300 of engine brake ramping, according to inventive concepts of the current disclosure. As a brief overview, the method 300 can include the engine brake ramping system receiving a signal indicative of a command to disengage an engine brake (STEP 302), and determining an incremental engine brake disengagement pattern using a predefined torque ramp rate (STEP 304). The method 300 can include the engine brake ramping system causing the engine brake to be gradually disengaged according to the incremental engine brake disengagement pattern (STEP 306).

The method 300 can include the engine brake ramping system or the controller 106 receiving a signal indicative of a command to disengage an engine brake (STEP 302). As discussed above with regard to FIG. 2, the controller 106 can receive input signals from various external systems 212, such as the engine brake switch, the electronic control throttle circuit, the transmission gearbox, the cruise control system or the engine brake system 104, among others. The controller 106 can receive the input signal repeatedly (e.g., according to a predefined frequency), responsive to predefined specific events or a combination of both. For instance, the controller 106 can repeatedly receive signals indicative of the current state of the engine brake system 104. The controller 106 can maintain a parameter indicative of the state (e.g., engaged or disengaged) of the engine brake system 104. The controller 106 can update the parameter as the controller 106 receives new signals indicative of the current state of the engine brake system 104.

The controller 106 can receive signals indicative of commands for, or events that suggest, disengaging the engine brake system responsive to such events. For example, the controller 106 can receive an accelerator pedal signal, e.g., from the electronic control throttle circuit, triggered responsive to the driver pressing the accelerator pedal while the vehicle 100 is under engine brake engaged condition (or mode). Upon the driver using the engine brake switch to disable the engine brake engaged condition (or mode), the switch can send an engine brake switch signal to the controller 106 indicative of act of the driver. The controller 106 can interpret the engine brake switch signal as a command to disengage the engine braking condition or mode, as long as the engine brake system 104 is currently enabled.

In some implementations, the driver can activate engine braking by shifting down through gears (or via another mechanism to initiate engine braking). The driver can then deactivate the engine braking condition (or state) by shifting up through gears or shifting out of gear. Upon the driver shifting up through gears or shifting out of gear, the transmission gearbox can send a signal to the controller 106 indicative of the gearshift. The controller 106 can perceive or interpret the signal from the transmission gearbox as a command or instruction to disengage the engine brake system 104, given that the engine brake system 104 is currently engaged. Also, when the vehicle 100 is in cruise control mode, the cruise control system can cause engine braking to be automatically activated, for example, when the vehicle is going downhill to maintain a steady speed. When the engine brake system 104 is to be disengaged, e.g., vehicle speed starts to decrease below the cruise control speed, the cruise control system can send a cruise control signal to the controller 106. The controller 106 can interpret the cruise control signal as a command to disengage or deactivate engine braking.

The controller 106 can check or verify the current state or condition of the engine brake system 104. If the engine brake system is determined to be in activated or engaged state, the controller 106 can interpret a received signal indicative of an event that suggest disengaging engine braking as a command to disengage the engine brake system 104.

The method 300 can include the engine brake ramping system or the controller 106 determining an incremental engine brake disengagement pattern using a predefined torque ramp rate (STEP 304). The controller 106 can store a value of the predefined torque ramp rate, for example, in the memory device 206. The controller 106 can receive, e.g., from the engine brake system 104 or other device, an indication of a current negative torque applied to the engine 102 by the engine brake system 104. The controller 106 can determine the incremental engine brake disengagement pattern using the predefined torque ramp rate and the current negative torque applied to the engine 102. In some implementations, determining the incremental engine brake disengagement pattern can include the controller 106 determining one or more incremental steps, at one or more respective time instances, to increase the negative torque applied to the engine 102 until reaching zero torque.

Instead of instantly and fully increasing the torque applied to the engine 102 to zero, the controller can determine multiple steps at which to incrementally increase the engine torque until it reaches a zero torque. For instance, considering an initial negative engine torque $T_0$ (e.g., equal to $-2,000$ Newton-meters (Nm)) at time instance to, the controller 106 can determine a sequence of increasing engine torques $T_1 \ldots T_n$ to be applied to the engine 102 at consecutive time intervals starting as an incremental approach of disengaging the engine braking condition or state. For example, the controller 106 can assign the engine torque $T_1$ to time interval $[t_0, t_1]$, assign the engine torque $T_2$ to time interval $[t_1, t_2]$ and assign the engine torque $T_n$ to a time interval starting at $t_{n-1}$. The torque $T_n$ can be equal to zero Nm. The time instances $t_0 \ldots t_{n-1}$ represent the time instances at which to increase the torque applied to the engine 102.

Given a predefined torque ramp rate $\alpha$ (e.g., equal to 7,000 Newton meters per second ($Nms^{-1}$)), the controller 106 may compute each engine torque $T_i$ as $T_i = \alpha(t_i - t_{i-1}) + T_0$. The discrete increasing engine torques $T_1 \ldots T_n$ can be viewed as an approximation of the continuous torque function $T(t) = \alpha(t - t_0) + T_0$, which describes a linearly decreasing continuous engine torque within the time interval $[t_0, t_{n-1}]$ such that $T(t_{n-1}) = 0$ Nm. In some implementations, the discrete increasing engine torques $T_1 \ldots T_n$ can be determined using another continuous function. Using the sequence of increasing engine torques $T_1 \ldots T_n$ allows for a smoother disengagement of the engine brake system 104 compared to an instant and full disengagement where the engine torque applied jumps instantly to zero Nm.

The predefined torque ramp rate $\alpha$ can be determined offline, for example, using experimental data or by a remote operator and then sent over a network to the controller via the communication interface for use with the vehicle 100. In general, the predefined torque ramp rate $\alpha$ can be selected as a value that would lead to a good trade-off between a smooth disengagement and an acceptable delay to completely disengage the engine brake system 104. Specifically, the predefined torque ramp rate $\alpha$ can be selected small enough to eliminate or mitigate cab jerk or shaking, and large enough such that the time delay $t_{n-1} - t_0$ (e.g., total time to achieve total disengagement of the brake engine system 104) is acceptable, e.g., to drivers. During field experiments, a plurality of different values for the predefined torque ramp rate $\alpha$ can be used and one value can be selected for use. In some implementations, the selected value can depend on the type of vehicle, type of engine or both.

In determining the sequence of increasing engine torques $T_1 \ldots T_n$, the controller 106 can use a lookup table. For example, depending on the design of the engine brake system 104 (e.g., the number of respective engine brake drivers 108 and/or the engine brake units that can be separately disengaged), the engine brake system 104 can be configured to produce only a predefined set of engine torque values, for example, depending on the various subsets of engine brake drivers 108 and/or the engine brake units that can be activated. The lookup table can include all the engine torque values that can be produced by the engine brake system 104, and can map each engine torque value to a corresponding subset of engine drivers that are to be activated to produce that engine torque value. The controller 106 can access the lookup table to determine the sequence of increasing engine torques $T_1 \ldots T_n$ to be used. The controller 106 can determine for each engine torque value, the corresponding time interval during which to apply that engine torque value, for example, using the equation $T_i = \alpha(t_i - t_{i-1}) + T_0$.

The method 300 can include the controller 106 causing the engine brake to be gradually disengaged according to the incremental engine brake disengagement pattern (STEP 306). The controller 106 can send instructions to engine brake system 104 commanding the engine brake system 104 to disengage incrementally or gradually. For example, the controller 106 can determine, e.g., using the lookup table, which engine brake driver(s) 108 to be disengaged at every time instance $t_i$ (for $0 \le i \le n-1$), and instruct the engine brake driver(s) 108 at time $t_i$ to be deactivated or disengaged. For an engine brake driver to be disengaged means that the engine brake driver opens (or closes) a corresponding subset of valves that were closed (or open) during the engine braking condition, or deactivate a corresponding electric retardation unit. In some implementations, the controller 106 can send at each time $t_i$ an indication of the engine torque to be applied during the time interval $[t_i, t_{i+1}]$ by the engine brake system 104 or a corresponding retarder. The engine brake engine 104 or corresponding retarder can incrementally or gradually disengage the engine brake system 104 according to the instructions or commands received from the controller 106.

Figure 4:
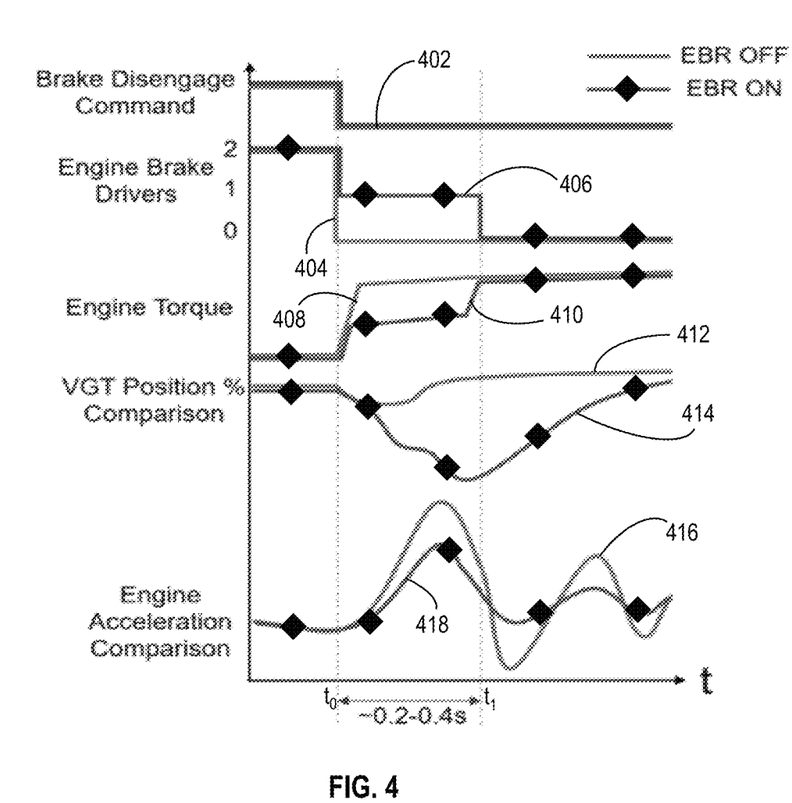
FIG. 4 are plots illustrating an example engine brake ramping approach, according to an example embodiment.

Referring to FIG. 4, plots illustrating an example engine brake ramping approach are shown, according to an example embodiment. The plots illustrate a comparison for disengagement of engine brake drivers, the engine torque, the variable-geometry turbocharger (VGT) position and the engine acceleration between the case when engine brake ramping (EBR) is applied and the case when instant and full engine brake disengagement is applied. The curve 402 illustrates engine brake disengaging command that is received at time $t_0$. The curve 402 is the same for both cases engine brake disengagement (with and without EBR).

The plots in FIG. 4 assume that the engine brake system 104 has two engine brake drivers 108. The curve 404 represents full and instant disengagement of both engine brake drivers at time instance $t_0$ (no EBR is applied). However, the curve 406 represents incremental disengagement of the engine brake drivers (EBR applied). The curve 406 shows that a first engine brake driver 108 is disengaged at time instance $t_0$ and the other is disengaged at time instance $t_1$. The curves 408 and 410 illustrate the change in actual engine torque without and with EBR, respectively. While the engine torque function shown by curve 408 is close to a step function as it jumps almost instantly from the initial negative torques to zero, the engine torque function shown by the curve 410 exhibits two smaller increase steps around time instance to and time instance $t_1$. At time instance $t_0$ (or immediately after), the engine torque function represented by the curve 410 jumps from the initial negative torque to a second negative torque with smaller magnitude. At time instance $t_1$, the engine torque function represented by the curve 410 jumps from the second negative torque to zero torque.

The curves 412 and 414 represent the change in VGT position for instant and full engine brake disengagement and for EBR, respectively. Comparing the two curves, one can see that the VGT position when EBR is employed is reduced immediately after time $t_0$ to fine tune the desired (or requested) second negative engine torque. The brake component 110 can modify the VGT position as an additional engine braking mechanism to meet the torque ramp rate request results in a more controlled and fine-tuned actual braking torque output when disengaging the engine brakes. The curves 416 and 418 represent the vehicle acceleration for full and abrupt disengagement of engine braking and for EBR, respectively. While both vehicle acceleration curves exhibit fluctuations responsive to engine brake disengagement, the magnitude of fluctuation for the vehicle acceleration 418 (when EBR is employed) is smaller than the magnitude of fluctuation for vehicle acceleration 416 (no EBR). The fluctuations in vehicle acceleration are indicative of cab jerk or shaking. A reduction in the magnitude of such fluctuations results in migration or reduction in cab jerk or shaking. Accordingly, by comparing the curves 416 and 418, one can see that EBR reduces cab jerk or shaking.

Table 1 below and FIGS. 5A-5D show experimental results illustrating vehicle jerk improvement when using the engine brake ramping (EBR) approach of FIG. 4 compared to abrupt and full engine brake disengagement.

TABLE 1

|  | Gear | EBR ON vs EBR OFF Jerk Reduction |
|---|---|---|
| Max | 5th | 34% |
| Average | 5th | 21% |
| Max | 6th | 30% |
| Average | 6th | 31% |
| Max | 7th | 33% |
| Average | 7th | 32% |
| Max | 8th | 20% |
| Average | 8th | 20% |

Figure 5A:
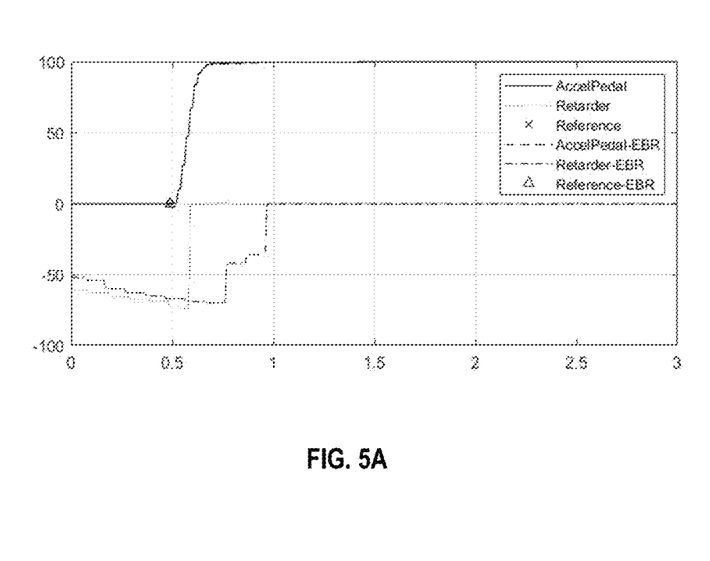
FIGS. 5A-5D are graphs of experimental results illustrating vehicle jerk improvement when using the engine brake ramping approach of FIG. 4, according to an example embodiment.
Figure 5B:
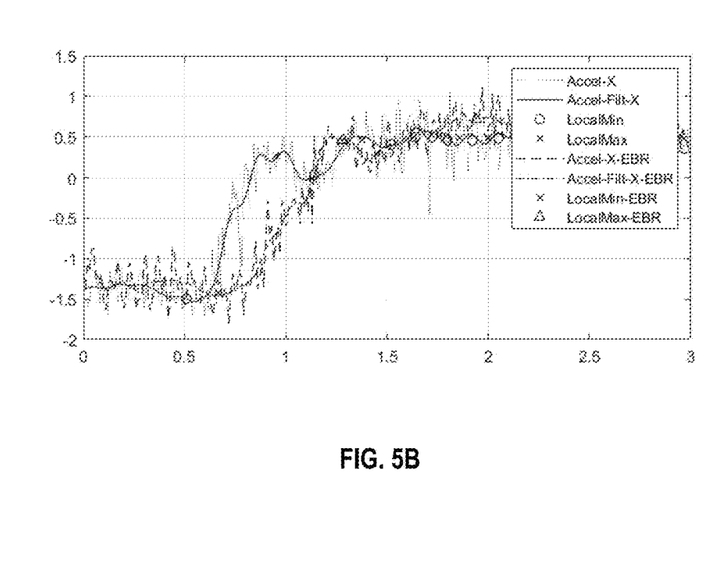
Figure 5C:
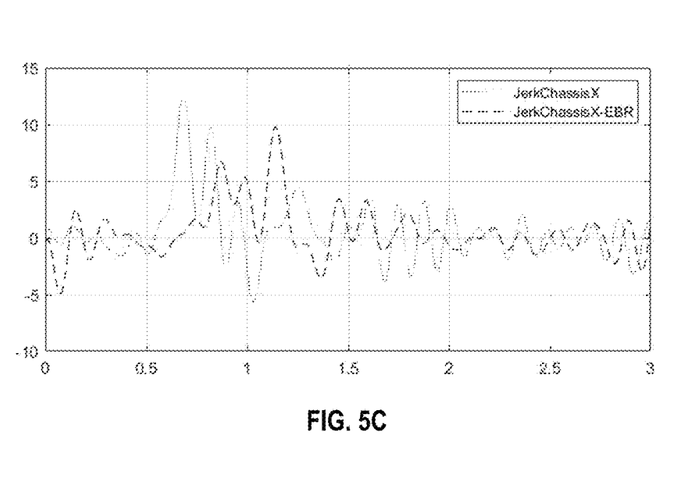
Figure 5D:
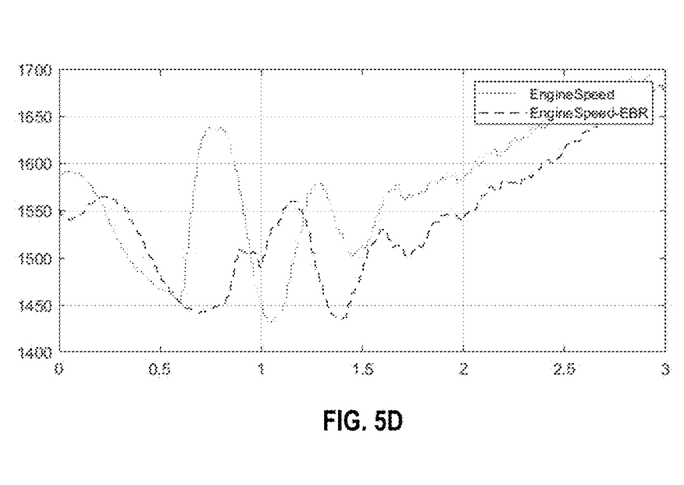

The experimental results illustrate the benefit of using EBR. Specifically, and as illustrated in Table 1, using EBR significantly reduces cab jerk at various gears. Similarly, FIGS. 5A-5D show significant reduction of cab and chassis jerk when using EBR. Specifically, FIG. 5A shows retarder disengagement with and without EBR. FIG. 5B shows plots illustrating filtered (or smoother) and unfiltered acceleration with and without EBR. FIG. 5C shows plots illustrating chassis jerk with and without EBR. FIG. 5D shows plots illustrating engine speed with and without EBR. The curves in FIGS. 5A-5D with the EBR designation show the improvement in reducing vehicle jerk when compared to the lines without the EBR designation. In the experimental results, jerk is computed as the rate of change of the acceleration, e.g., in meter per second cube ($ms^{-3}$).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIGS. 1 and 2, it should be understood that the controller 106 may include any number of circuits for completing the functions described herein. For example, the activities and functionalities of the engine braking circuit 208 may be combined in multiple circuits or as a single circuit. Additional circuits with additional functionality may also be included. Further, the controller 106 may further control other activity beyond the scope of the present disclosure.

As mentioned above and in one configuration, the "circuits" may be implemented in machine-readable medium for execution by various types of processors, such as the processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein. For example, the controller 106 of the exemplary embodiment described with regard to FIG. 2 may be incorporated in the engine brake system 104 of the exemplary embodiment described with regard to FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A controller for controlling engine brake disengagement, the controller comprising:
 a processor; and
 a memory storing executable instructions, the executable instructions, when executed by the processor, cause the processor to:
  receive a signal indicative of a command to disengage an engine brake for an engine in an engine brake engaged condition, the engine subjected to a first negative torque under the engine brake engaged condition;
  determine an incremental engine brake disengagement pattern using a predefined torque ramp rate; and
  cause the engine brake to be gradually disengaged over a time period according to the incremental engine brake disengagement pattern.

2. The controller of claim 1, wherein in causing the engine brake to be gradually disengaged over the time period according to the incremental engine brake disengagement pattern, the executable instructions further cause the processor to:
  disable a first engine brake driver at a first time instance; and
  disable a second engine brake driver at a second time instance subsequent to the first time instance, the first and second time instances within the time period and the first and second engine brake drivers controlling the engine brake.

3. The controller of claim 2, wherein in determining the incremental engine brake disengagement pattern, the executable instructions further cause the processor to determine the first and second time instances using the first negative torque and the predefined torque ramp rate.

4. The controller of claim 2, wherein in determining the incremental engine brake disengagement pattern, the executable instructions further cause the processor to determine the first and second time instances using the first negative torque and a lookup table.

5. The controller of claim 1, wherein in causing the engine brake to be gradually disengaged over the time period, the executable instructions further cause the processor to:
  send a first request for a second negative torque greater than the first negative torque to a retarder at a first time instance, the retarder applying the second negative torque instead of the first negative torque to the engine at the first time instance responsive to the first request; and
  send a second request for zero torque to the retarder at a second time instance subsequent to the first time, the retarder applying the zero torque instead of the second negative torque to the engine at the second time instance responsive to the second request.

6. The controller of claim 1, wherein the engine brake includes at least one of a compression release engine brake or an exhaust engine brake.

7. The controller of claim 1, wherein the signal includes at least one of:
  an accelerator pedal signal;
  a cruise control signal for disengaging the engine brake to maintain a predefined speed during a cruise control mode;
  gearshift; or
  an engine brake switch signal.

8. A method of controlling engine brake disengagement, the method comprising:
  receiving, by a controller, a signal indicative of a command to disengage an engine brake for an engine in an engine brake engaged condition, the engine subjected to a first negative torque under the engine brake engaged condition;
  determining, by the controller, an incremental engine brake disengagement pattern using a predefined torque ramp rate; and
  causing, by the controller. the engine brake to be gradually disengaged over a time period according to the incremental engine brake disengagement pattern.

9. The method of claim 8, wherein causing the engine brake to be gradually disengaged over the time period according to the incremental engine brake disengagement pattern includes:
  disabling, by the controller, a first engine brake driver at a first time instance; and
  disabling, by the controller, a second engine brake driver at a second time instance subsequent to the first time instance, the first and second time instances within the time period and the first and second engine brake drivers controlling the engine brake.

10. The method of claim 9, wherein determining the incremental engine brake disengagement pattern includes:
  determining, by the controller, the first and second time instances using the first negative torque and the predefined torque ramp rate.

11. The method of claim 9, wherein determining the incremental engine brake disengagement pattern includes:
  determining the first and second time instances using the first negative torque and a lookup table.

12. The method of claim 8, wherein causing the engine brake to be gradually disengaged over the time period includes:
  sending a first request for a second negative torque greater than the first negative torque to a retarder at a first time instance, the retarder applying the second negative torque instead of the first negative torque to the engine at the first time instance responsive to the first request; and
  sending a second request for a third negative or zero torque to the retarder at a second time instance subsequent to the first time, the retarder applying the third negative or zero torque instead of the second negative torque to the engine at the second time instance responsive to the second request.

13. The method of claim 8, wherein the engine brake includes at least one of a compression release engine brake or an exhaust engine brake.

14. The method of claim 8, wherein the signal includes at least one of:
  an accelerator pedal signal;
  a cruise control signal for disengaging the engine brake to maintain a predefined speed during a cruise control mode;
  a signal is indicative of a gear shift; or
  an engine switch signal.

15. A system, comprising:
  an engine brake system; and
  a controller coupled to the engine brake system, the controller configured to: receive a signal indicative of a command to disengage an engine brake while the engine brake system is engaged, an engine subjected to a first negative torque under the engine brake engaged condition;
  determine an incremental engine brake disengagement pattern using predefined torque ramp rate; and
  cause the engine brake to be gradually disengaged over a time period according to the incremental engine brake disengagement pattern.

16. The system of claim 15, wherein in causing the engine brake to be gradually disengaged over the time period according to the incremental engine brake disengagement pattern, the controller is configured to:
  disable a first engine brake driver at a first time instance; and
  disable a second engine brake driver at a second time instance subsequent to the first time instance, the first and second time instances within the time period and the first and second engine brake drivers controlling the engine brake.

17. The system of claim 16, wherein in determining the incremental engine brake disengagement pattern the controller is configured to:

determine the first and second time instances using the first negative torque and the predefined torque ramp rate; or determine the first and second time instances using the first negative torque and a lookup table.

18. The system of claim 15, wherein in causing the engine brake to be gradually disengaged over the time period according to the incremental engine brake disengagement pattern, the controller is configured to:

send a first request for a second negative torque greater than the first negative torque to a retarder at a first time instance, the retarder applying the second negative torque instead of the first negative torque to the engine at the first time instance responsive to the first request; and send a second request for a third negative or zero torque to the retarder at a second time instance subsequent to the first time, the retarder applying the third negative or zero torque instead of the second negative torque to the engine at the second time instance responsive to the second request.

19. The system of claim 15, wherein the engine brake includes at least one of a compression release engine brake or an exhaust engine brake.

20. The system of claim 15, wherein the signal includes at least one of:

an accelerator pedal signal;

a cruise control signal for disengaging the engine brake to maintain a predefined speed of the vehicle during a cruise control mode;

a signal is indicative of a gear shift; or an engine switch signal.

\* \* \* \* \*